(12) United States Patent
Zhou et al.

(10) Patent No.: US 11,584,677 B2
(45) Date of Patent: Feb. 21, 2023

(54) DEVICE FOR PRESS-CUTTING GLASS, METHOD FOR PRESS-CUTTING GLASS, AND GLASS-CUTTING SYSTEM

(71) Applicants: TUNGHSU TECHNOLOGY GROUP CO., LTD., Beijing (CN); TUNGHSU GROUP CO., LTD., Shijiazhuang (CN)

(72) Inventors: Bo Zhou, Shijiazhuang (CN); Qing Li, Shijiazhuang (CN); Lihong Wang, Shijiazhuang (CN)

(73) Assignees: TUNGHSU TECHNOLOGY GROUP CO., LTD., Beijing (CN); TUNGHSU GROUP CO., LTD., Shijiazhuang (CN)

( * ) Notice: Subject to any disclaimer, the term of this patent is extended or adjusted under 35 U.S.C. 154(b) by 0 days.

(21) Appl. No.: 16/610,766

(22) PCT Filed: May 4, 2018

(86) PCT No.: PCT/CN2018/085573
§ 371 (c)(1),
(2) Date: Nov. 4, 2019

(87) PCT Pub. No.: WO2018/202119
PCT Pub. Date: Nov. 8, 2018

(65) Prior Publication Data
US 2020/0055765 A1    Feb. 20, 2020

(30) Foreign Application Priority Data
May 5, 2017 (CN) .......................... 201710312692.7

(51) Int. Cl.
*C03B 33/023* (2006.01)
*C03B 33/10* (2006.01)

(52) U.S. Cl.
CPC .......... *C03B 33/023* (2013.01); *C03B 33/105* (2013.01)

(58) Field of Classification Search
CPC ............... Y10T 225/12; Y10T 225/325; Y10T 225/371; Y10T 225/379; Y10T 225/386;
(Continued)

(56) References Cited

U.S. PATENT DOCUMENTS 1,895,779 A * 1/1933 Aurien .................. C03B 33/072
225/2
3,398,868 A * 8/1968 Barsom ................. C03B 33/033
225/103
(Continued)

FOREIGN PATENT DOCUMENTS

CN    1878732 A    12/2006
CN    102380713 A    3/2012
(Continued)

*Primary Examiner* — Evan H MacFarlane
(74) *Attorney, Agent, or Firm* — Volpe Koenig (57) ABSTRACT

A device for press-cutting glass, a method for press-cutting glass, and a glass-cutting system having the device for press-cutting glass. The device for press-cutting glass comprises a supporting member, having a first supporting portion and a second supporting portion for supporting a glass substrate, which are arranged in a spaced apart manner in a first direction; and a press-cutting member for press-cutting an edge of the glass substrate, which is positioned between the first supporting portion and the second supporting portion in the first direction. The device for press-cutting glass has advantages including high press-cutting efficiency, simple structure, low manufacturing cost, and easy assembling with other devices.

7 Claims, 3 Drawing Sheets

(58) Field of Classification Search
CPC ....... B26F 3/002; C03B 33/02; C03B 33/023; C03B 33/03; C03B 33/105
USPC .......................... 225/2, 96.5, 103, 104, 105
See application file for complete search history.

(56) References Cited

U.S. PATENT DOCUMENTS

| | | | | |
|---|---|---|---|---|
| 3,454,219 | A * | 7/1969 | Barsom | C03B 33/033 225/1 |
| 4,607,775 | A * | 8/1986 | Krause | G02B 6/25 225/96.5 |
| 4,948,025 | A * | 8/1990 | Lisec | C03B 33/033 225/104 |
| 6,171,933 | B1 * | 1/2001 | Xu | B28D 5/0011 225/5 |
| 6,434,974 | B1 * | 8/2002 | Lisec | C03B 33/078 225/104 |
| 8,276,796 | B2 * | 10/2012 | Nishisaka | B28D 5/0011 225/96.5 |
| 2004/0050225 | A1 * | 3/2004 | Steiner | B26D 7/1818 83/13 |
| 2007/0051769 | A1 * | 3/2007 | Otoda | C03B 33/093 225/2 |
| 2007/0158381 | A1 | 7/2007 | Lisec | |
| 2013/0236675 | A1 * | 9/2013 | Garner | B65H 19/1852 428/54 |
| 2015/0158197 | A1 * | 6/2015 | Takaichi | B23D 31/002 225/3 |
| 2015/0284284 | A1 * | 10/2015 | Konishi | C03B 33/033 65/105 |
| 2020/0055765 | A1 | 2/2020 | Zhou et al. | |

FOREIGN PATENT DOCUMENTS

| | | | | |
|---|---|---|---|---|
| CN | 104003609 | A | 8/2014 | |
| CN | 104803594 | * | 7/2015 | |
| CN | 104803594 | A | 7/2015 | |
| CN | 106977089 | A | 7/2017 | |
| EP | 1334953 | A2 * | 8/2003 | ........... C03B 33/033 |
| EP | 1334953 | A2 | 8/2003 | |
| EP | 2177482 | A1 | 4/2010 | |
| EP | 2520550 | A1 * | 11/2012 | ........... B65G 49/068 |
| JP | 2007-099563 | A | 4/2007 | |
| JP | 2009-083079 | A | 4/2009 | |
| JP | 2012-045830 | A | 3/2012 | |
| JP | 2015-140289 | A | 8/2015 | |
| KR | 10-2015-0090811 | | 8/2015 | |

* cited by examiner

DEVICE FOR PRESS-CUTTING GLASS, METHOD FOR PRESS-CUTTING GLASS, AND GLASS-CUTTING SYSTEM

CROSS REFERENCE TO RELATED APPLICATIONS

This application is a 35 USC § 371 national stage of PCT/CN2018/085573, which was filed May 4, 2018, is entitled "DEVICE FOR PRESS-CUTTING GLASS, METHOD FOR PRESS-CUTTING GLASS, AND GLASS-CUTTING SYSTEM, and claims priority to Chinese Application No. 201710312692.7, filed on May 5, 2017," both of which are incorporated herein by reference as if fully set forth.

FIELD OF INVENTION

The present invention relates to the glass cutting field, particularly to a device for press-cutting glass, a method for press-cutting glass, and a glass cutting system having the device for press-cutting glass.

BACKGROUND

The requirements for outline dimensions of glass substrates for flat panel displays are very high. In the production of glass substrates, a precision cutting apparatus is needed to cut the four edges of the glass substrate precisely, so as to cut the glass substrate into specified dimensions. At present, the mainstream technical process consists of two procedures: scribing with a cutter wheel and breaking-off.

During continuous production, the glass substrate products are fed into the cutting apparatus sequentially, and are subject to scribing and breaking-off one by one. Wherein, usually two sets of scribing device and breaking-off device are provided for the two edges of the glass substrate parallel to the conveying direction for synchronous processing. In contrast, only one set of breaking-off device is provided for the two edges of the glass substrate perpendicular to the conveying direction. Therefore, each glass substrate has to be broken off twice, which limits the improvement of glass substrate processing efficiency. It is very difficult to provide two sets of breaking-off mechanisms for the two edges of the glass substrate perpendicular to the conveying direction owing to cost and design considerations.

SUMMARY

To solve the problems in the prior art, the present invention provides a device for press-cutting glass, which has an advantage of high press-cutting efficiency.

To attain the above object, in a first aspect, the present invention provides a device for press-cutting glass, which comprises: a supporting member, having a first supporting portion and a second supporting portion for supporting a glass substrate, wherein the first supporting portion and the second supporting portion are arranged spaced apart in a first direction; and a press-cutting member for press-cutting the edge of the glass substrate, the press-cutting member is positioned between the first supporting portion and the second supporting portion in the first direction.

Preferably, the device for press-cutting glass further comprises a stop member for stopping the glass substrate from turning over, wherein the stop member has a first stop portion and a second stop portion for stopping the glass substrate, which are arranged spaced apart in the first direction, and the first supporting portion and the second supporting portion are located between the first stop portion and the second stop portion in the first direction; preferably, the first stop portion is a first sucking disk, and the second stop portion is a second sucking disk; more preferably, the first stop portion comprises a first driving member and a first pressing plate for pressing the glass substrate, and the first driving member is connected with the first pressing plate so as to drive the first pressing plate to move up and down; the second stop portion comprises a second driving member and a second pressing plate for pressing the glass substrate, and the second driving member is connected with the second pressing plate so as to drive the second pressing plate to move up and down; preferably, each of the first driving member and the second driving member is an air cylinder, electric cylinder, electric motor, or hydraulic cylinder.

Preferably, the first supporting portion comprises a third driving member and a first supporting pole for supporting the glass substrate, and the third driving member is connected with the first supporting pole so as to drive the first supporting pole to move up and down; the second supporting portion comprises a fourth driving member and a second supporting pole for supporting the glass substrate, and the fourth driving member is connected with the second supporting pole so as to drive the second supporting pole to move up and down; preferably, each of the third driving member and the fourth driving member is an air cylinder, electric cylinder, electric motor, or hydraulic cylinder.

Preferably, each of the first stop portion, the second stop portion, the first supporting portion, and the second supporting portion is movably arranged in the first direction.

Preferably, the press-cutting member comprises a pressing head and a fifth driving member, and the fifth driving member is connected with the pressing head so as to drive the pressing head to move up and down; preferably, the fifth driving member is an air cylinder, electric cylinder, electric motor, or hydraulic cylinder.

Preferably, the press-cutting member comprises a sixth driving member, a first rotary press-cutting portion and a second rotary press-cutting portion, the sixth driving member is connected with the first rotary press-cutting portion and the second rotary press-cutting portion so as to drive the first rotary press-cutting portion and the second rotary press-cutting portion to rotate; preferably, the sixth driving member is an electric motor.

Preferably, the first rotary press-cutting portion comprises a first connecting plate connected with the sixth driving member and a first press-cutting plate connected with the first connecting plate, the first connecting plate is perpendicular to the first press-cutting plate; the second rotary press-cutting portion comprises a second connecting plate connected with the sixth driving member and a second press-cutting plate connected with the second connecting plate, the second connecting plate is perpendicular to the second press-cutting plate; preferably, the first rotary press-cutting portion and the second rotary press-cutting portion are arranged spaced apart in the first direction, the sixth driving member drives the first rotary press-cutting portion to rotate in one of clockwise direction and counter-clockwise direction, and the sixth driving member drives the second rotary press-cutting portion to rotate in the other of clockwise direction and counter-clockwise direction.

Preferably, the device for press-cutting glass further comprises: a camera for capturing an image of the scribing mark on the glass substrate; a conveying member for conveying the glass substrate; and a controller connected to the camera and the conveying member so as to control the conveying member to carry out conveying by a preset distance according to the image captured by the camera; preferably, the camera is spaced from the first supporting portion by a first distance, the camera is spaced from the second supporting portion by a second distance, wherein after the camera captured a scribing mark on a glass substrate, the controller controls the conveying member to convey said glass substrate by the second distance, and, after the camera captured a scribing mark on another glass substrate, the controller controls the conveying member to convey said another glass substrate by the first distance.

In a second aspect, the present invention provides a method for press-cutting glass, which comprises the following steps: (a) conveying a first glass substrate having a first scribing mark perpendicular to a first direction to a first preset position in the first direction, and press-cutting the edge of the first glass substrate at the first scribing mark; (b) conveying the first glass substrate having a second scribing mark perpendicular to the first direction to a second preset position adjacent to the first preset position in the first direction, and conveying a second glass substrate having a third scribing mark perpendicular to the first direction to the first preset position in the first direction, and press-cutting the edge of the first glass substrate at the second scribing mark and press-cutting the edge of the second glass substrate at the third scribing mark at the same time; and (c) repeating the step (b). Preferably, the method for press-cutting glass is implemented with the device for press-cutting glass according to the first aspect of the present invention.

In a third aspect, the present provides a glass cutting system, which comprises the device for press-cutting glass according to the first aspect of the present invention.

By arranging a first supporting portion and a second supporting portion spaced apart in a first direction and arranging press-cutting members between the first supporting portion and the second supporting portion, the device for press-cutting glass according to the present invention may utilize the press-cutting members to press-cut the edges of two glass substrates supported on the first supporting portion and the second supporting portion at the same time, i.e., two edges can be press-cut at the same time.

Compared with the prior art in which only one edge of the glass substrate is press-cut at a time, the device for press-cutting glass according to the present invention makes the press-cutting efficiency doubled without providing two sets of press-cutting devices.

Therefore, the device for press-cutting glass according to the present invention has advantages including high press-cutting efficiency, simple structure, low manufacturing cost, and easy assembling with other devices.

DETAILED DESCRIPTION OF THE PREFERRED EMBODIMENTS

Hereunder some embodiments of the present invention will be detailed, and examples of the embodiments are shown in the accompanying drawings. It should be noted that the embodiments described with reference to the accompanying drawings are only exemplary and are provided only to explain the present invention rather than constituting any limitation to the present invention.

Figure 1:
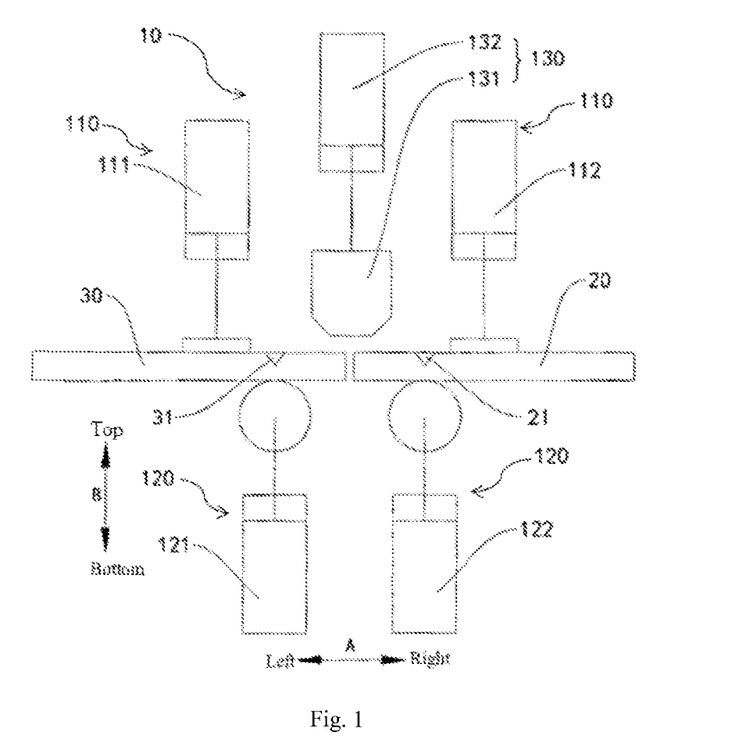
FIG. 1 is a schematic structural diagram of the device for press-cutting glass according to an embodiment of the present invention.
Figure 2:
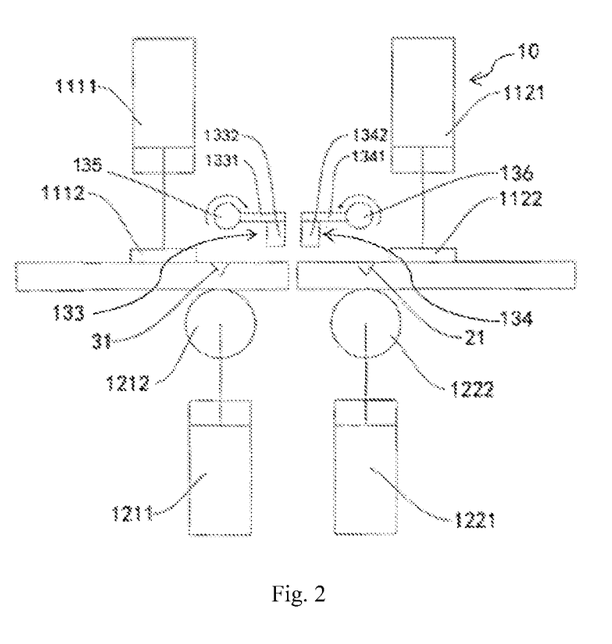
FIG. 2 is a schematic structural diagram of the device for press-cutting glass according to an embodiment of the present invention.

Hereunder the device for press-cutting glass 10 according to an embodiment of the present invention will be described with reference to the accompanying drawings. As shown in FIGS. 1 and 2, the device for press-cutting glass 10 according to an embodiment of the present invention comprises a supporting member 120 and a press-cutting member 130 for press-cutting the edge of a glass substrate.

The supporting member 120 has a first supporting portion 121 and a second supporting portion 122 for supporting the glass substrate. Wherein, the first supporting portion 121 and the second supporting portion 122 are arranged spaced apart in a first direction. The first direction is the conveying direction of the glass substrate. The press-cutting member 130 is arranged between the first supporting portion 121 and the second supporting portion 122 in the first direction.

Hereunder the working process of the device for press-cutting glass 10 according to an embodiment of the present invention will be described with reference to FIGS. 1 and 2. The working process of the device for press-cutting glass 10 according to an embodiment of the present invention comprises the following steps:

(a) conveying a first glass substrate 20 having a first scribing mark (scribing line) perpendicular to the first direction to a first preset position in the first direction, and press-cutting the edge of the first glass substrate 20 at the first scribing mark;

(b) conveying the first glass substrate 20 (previous glass substrate) having a second scribing mark perpendicular to the first direction to a second preset position adjacent to the first preset position in the first direction, conveying a second glass substrate 30 (next glass substrate) having a third scribing mark perpendicular to the first direction to the first preset position in the first direction, and press-cutting the edge of the first glass substrate 20 at the second scribing mark and press-cutting the edge of the second glass substrate 30 at the third scribing mark at the same time;

(c) repeating the step (b). For example, conveying the second glass substrate 30 having a fourth scribing mark perpendicular to the first direction to the second preset position in the first direction, conveying a third glass substrate having a fifth scribing mark perpendicular to the first direction to the first preset position in the first direction, and press-cutting the edge of the second glass substrate 30 at the fourth scribing mark and press-cutting the edge of the third glass substrate at the fifth scribing mark at the same time.

Specifically, a first glass substrate 20 having a first scribing mark perpendicular to the first direction is conveyed to a first preset position in the first direction. At the first preset position, the first supporting portion 121 supports the first glass substrate 20, and preferably a first stop portion 111 stops the first glass substrate 20 to prevent the first glass substrate 20 from turning over. Next, the edge of the first glass substrate 20 at the first scribing mark is press-cut by the press-cutting member 130.

Then, the first glass substrate 20 having a second scribing mark perpendicular to the first direction is conveyed to a second preset position adjacent to the first preset position in the first direction. At the second preset position, the second supporting portion 122 supports the first glass substrate 20, and preferably a second stop portion 112 stops the first glass substrate 20 to prevent the first glass substrate 20 from turning over. Moreover, a second glass substrate 30 having a third scribing mark perpendicular to the first direction is conveyed to the first preset position in the first direction; in the first preset position, the first supporting portion 121 supports the second glass substrate 30, and preferably the first stop portion 111 stops the second glass substrate 30 to prevent the second glass substrate 30 from turning over. Then, the edge of the first glass substrate 20 at the second scribing mark and the edge of the second glass substrate 30 at the third scribing mark are press-cut at the same time.

Next, the second glass substrate 30 having a fourth scribing mark perpendicular to the first direction is conveyed to the second preset position in the first direction, a third glass substrate having a fifth scribing mark perpendicular to the first direction is conveyed to the first preset position in the first direction, and the edge of the second glass substrate 30 at the fourth scribing mark and the edge of the third glass substrate at the fifth scribing mark are press-cut at the same time.

The process described above is repeated continuously, till the edges of all glass substrates perpendicular to the first direction are press-cut. Wherein, all glass substrates may be scribed first before the edges of the glass substrates are press-cut. Alternatively, only the edge to be press-cut may be scribed to obtain a scribing mark, and then the follow-up glass substrate may be scribed after the press-cutting of the edge.

FIG. 1 shows the first glass substrate 20 in the second preset position with the scribing mark 21 being the second scribing mark, and that FIG. 1 also shows the second glass substrate 30 in the first preset position with scribing mark 31 being the third scribing mark. The position of the second glass substrate 30 shown in FIG. 1 also corresponds to the first preset position of the first glass substrate prior to the first glass substrate 20 being moved into the second preset position, where the first glass substrate includes a first scribing mark corresponding to scribing mark 31.

By arranging a first supporting portion 121 and a second supporting portion 122 spaced apart in a first direction and arranging press-cutting members 130 between the first supporting portion 121 and the second supporting portion 122, the device for press-cutting glass 10 according to an embodiment of the present invention can utilize the press-cutting members 130 to press-cut the edges of two glass substrates supported on the first supporting portion 121 and the second supporting portion 122 respectively at the same time, i.e., two edges can be press-cut at the same time.

Compared with the prior art in which only one edge of the glass substrate is press-cut, the device for press-cutting glass 10 according to an embodiment of the present invention makes the press-cutting efficiency doubled without providing two sets of press-cutting devices.

Therefore, the device for press-cutting glass 10 according to an embodiment of the present invention has advantages including high press-cutting efficiency, simple structure, low manufacturing cost, and easy assembling with other devices.

As shown in FIGS. 1 and 2, in some embodiments of the present invention, the device for press-cutting glass 10 comprises a stop member 110 for stopping the glass substrate from turning over, a supporting member 120, and a press-cutting member 130. For the convenience of description, the left-right direction is indicated by an arrow A in FIG. 1, and the top-bottom direction is indicated by an arrow B in FIG. 1. Wherein, the glass substrate is conveyed from left to right.

The stop member 110 has a first stop portion 111 and a second stop portion 112 for stopping the glass substrate, the first stop portion 111 and the second stop portion 112 are arranged spaced apart in the first direction, and a first supporting portion 121 and a second supporting portion 122 are positioned between the first stop portion 111 and the second stop portion 112 in the first direction.

A lever structure is formed when the glass substrate is supported on the first supporting portion 121 and the second supporting portion 122. The glass substrate tends to turn over around the first supporting portion 121 and the second supporting portion 122 under the acting force of the press-cutting member 130, but the gravity of the glass substrate can prevent the over-turning tendency of the glass substrate. The stop member 110 having a first stop portion 111 and a second stop portion 112 can further stop the glass substrate from turning over, and thereby the press-cutting process is performed more smoothly.

Wherein, the first stop portion 111 may be a first sucking disk, the second stop portion 112 may be a second sucking disk, and the first sucking disk and the second sucking disk may suck to the bottom surface of the glass substrate.

As shown in FIGS. 1 and 2, the first stop portion 111 comprises a first driving member 1111 and a first pressing plate 1112 used to press the glass substrate, and the first driving member 1111 is connected with the first pressing plate 1112 so as to drive the first pressing plate 1112 to move up and down. The second stop portion 112 comprises a second driving member 1121 and a second pressing plate 1122 used to press the glass substrate, and the second driving member 1121 is connected with the second pressing plate 1122 so as to drive the second pressing plate 1122 to move up and down.

Preferably, both the first pressing plate 1112 and the second pressing plate 1122 are flat plates, so that they can press the glass substrate better. More preferably, the first pressing plate 1112 and the second pressing plate 1122 extend in a second direction perpendicular to the first direction.

Optimally, when the glass substrate is pressed, the edges of the first pressing plate 1112 are flush to the edges of a glass substrate and the edges of the second pressing plate 1122 are flush to the edges of a glass substrate in the second direction. Thus, the first pressing plate 1112 and the second pressing plate 1122 may apply adequate pressure to the glass substrates uniformly.

As shown in FIGS. 1 and 2, the first pressing plate 1112 and the second pressing plate 1122 are arranged spaced apart in the left-right direction (i.e., the first direction), and the second pressing plate 1122 is at the right side of the first pressing plate 1112. The first driving member 1111 is positioned above the first pressing plate 1112, and the second driving member 1121 is positioned above the second pressing plate 1122.

Figure 3:
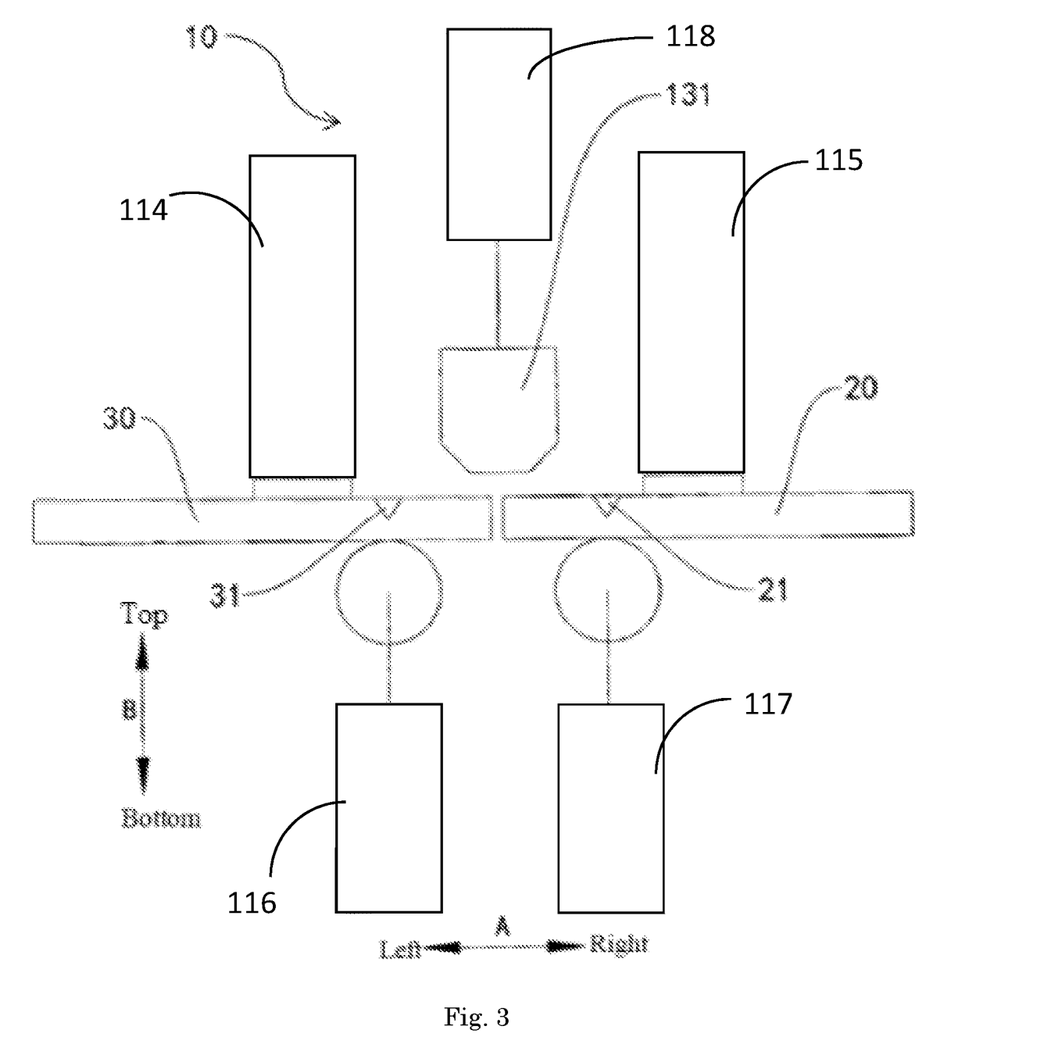
FIG. 3 is a schematic structural diagram of the device for press-cutting glass according to an embodiment of the present invention.

As shown in FIG. 3, the first drive 114, the second drive 115, the third drive 116, the fourth drive 117, and the fifth drive 118 may be an air cylinder, electric cylinder, electric motor, or hydraulic cylinder.

In an embodiment of the present invention, as shown in FIGS. 1 and 2, the first supporting portion 121 comprises a third driving member 1211 and a first supporting column 1212 used to support the glass substrate, and the third driving member 1211 is connected with the first supporting column 1212 so as to drive the first supporting column 1212 to move up and down. The second supporting portion 122 comprises a fourth driving member 1221 and a second supporting column 1222 used to support the glass substrate, and the fourth driving member 1221 is connected with the second supporting column 1222 so as to drive the second supporting column 1222 to move up and down. Preferably, the first supporting column 1212 and the second supporting column 1222 are in a cylindrical shape respectively, so that they not only support the glass substrate better, but also don't hinder the edges of the glass substrate from moving downward under the action of the stop member 110. More preferably, the first supporting column 1212 and the second supporting column 1222 extend in the second direction.

Optimally, when the glass substrate is supported, the edges of the first supporting column 1212 are flush to the edges of a glass substrate and the edges of the second supporting column 1222 are flush to the edges of a glass substrate in the second direction. Thus, the first supporting column 1212 and the second supporting column 1222 may provide adequate support to the glass substrates uniformly.

As shown in FIGS. 1 and 2, the first supporting column 1212 and the second supporting column 1222 are arranged spaced apart in the left-right direction, and the second supporting column 1222 is at the right side of the first supporting column 1212. The first supporting portion 121 and the second supporting portion 122 are positioned between the first pressing plate 1112 and the second pressing plate 1122 in the left-right direction, i.e., the first supporting column 1212 is at the right side of the first pressing plate 1112, and the second supporting column 1222 is at the left side of the second pressing plate 1122.

The third driving member 1211 is positioned below the first supporting column 1212, and the fourth driving member 1221 is positioned below the second supporting column 1222.

As shown in FIGS. 1 and 2, the second supporting column 1222 supports the first glass substrate 20, and the first supporting column 1212 supports the second glass substrate 30, wherein the second supporting column 1222 is right below a scribing mark 21 on the first glass substrate 20, and the first supporting column 1212 is right below a scribing mark 31 on the second glass substrate 30. In other words, the second supporting column 1222 is aligned to the scribing mark 21 on the first glass substrate 20 in the top-bottom direction, and the first supporting column 1212 is aligned to the scribing mark 31 on the second glass substrate 30 in the top-bottom direction. Thus, the edges of the glass substrates can be press-cut more easily.

Preferably, the central axis of the cylindrical second supporting column 1222 is right below the scribing mark 21 on the first glass substrate 20, and the central axis of the cylindrical first supporting column 1212 is right below the scribing mark 31 on the second glass substrate 30. Thus, the edges of the glass substrates can be press-cut more easily.

Specifically, each of the first driving member 1111, the second driving member 1121, the third driving member 1211, and the fourth driving member 1221 is an air cylinder, electric cylinder, electric motor, or hydraulic cylinder.

After the glass substrates are conveyed to preset positions, the third driving member 1211 drives the first supporting column 1212 to move up, the fourth driving member 1221 drives the second supporting column 1222 to move up, so that the first supporting column 1212 and the second supporting column 1222 support the glass substrates. The first driving member 1111 drives the first pressing plate 1112 to move down, and the second driving member 1121 drives the second pressing plate 1122 to move down, so that the first pressing plate 1112 and the second pressing plate 1122 press the glass substrates.

After the edges of a glass substrate are press-cut, the third driving member 1211 drives the first supporting column 1212 to move down, the fourth driving member 1221 drives the second supporting column 1222 to move down, the first driving member 1111 drives the first pressing plate 1112 to move up, and the second driving member 1121 drives the second pressing plate 1122 to move up, so that the first supporting column 1212, the second supporting column 1222, the first pressing plate 1112, and the second pressing plate 1122 may leave the glass substrate, and the glass substrate can be conveyed to the next position.

In a specific example of the present invention, each of the first stop portion 111, the second stop portion 112, the first supporting portion 121 and the second supporting portion 122 are movably arranged in the first direction. Thus, the device for press-cutting glass 10 may handle glass substrates in different specifications, adapt to scribing marks in different specifications, and remove edges in different widths.

When the edge of the glass substrate is press-cut, the press-cutting member 130 may be positioned above the glass substrate so as to apply downward pressure to the glass. Alternatively, the press-cutting member 130 may be positioned below the glass substrate so as to apply upward pressure to the glass substrate.

As shown in FIG. 1, in an example of the present invention, the press-cutting member 130 comprises a pressing head 131 and a fifth driving member 132, and the fifth driving member 132 is connected with the pressing head 131 so as to drive the pressing head 131 to move up and down. The fifth driving member 132 may be an air cylinder, electric cylinder, electric motor, or hydraulic cylinder.

After two glass substrates are conveyed to preset positions, the fifth driving member 132 drives the pressing head 131 to move down so as to press-cut the edges of the two glass substrates at the same time. After the press-cutting, the fifth driving member 132 drives the pressing head 131 to move up, so that the glass substrate can be conveyed to the next position.

As shown in FIG. 1, the pressing head 131 is positioned between the first supporting pole 1212 and the second supporting pole 1222 in the left-right direction, the fifth driving member 132 is positioned above the pressing head 131, the left edge of the pressing head 131 is at the left side of the right edge of the second glass substrate 30, and the right edge of the pressing head 131 is at the right side of the left edge of the first glass substrate 20.

As shown in FIG. 2, in another example of the present invention, the press-cutting member 130 comprises a sixth driving member (not shown), a first rotary press-cutting portion 133 and a second rotary press-cutting portion 134. The sixth driving member is an electric motor, and is connected to the first rotary press-cutting portion 133 and the second rotary press-cutting portion 134 so as to drive the first rotary press-cutting portion 133 and the second rotary press-cutting portion 134 to rotate.

When the glass substrates are conveyed to preset positions, the sixth driving member drives the first rotary press-cutting portion 133 and the second rotary press-cutting portion 134 to rotate, so that the first rotary press-cutting portion 133 and the second rotary press-cutting portion 134 come in contact with the edges of the glass substrates. Then, the sixth driving member further drive the first rotary press-cutting portion 133 and the second rotary press-cutting portion 134 to rotate so as to press-cut the edges of the glass substrates.

As shown in FIG. 2, in a specific example of the present invention, the first rotary press-cutting portion 133 comprises a first connecting plate 1331 connected with the sixth driving member and a first press-cutting plate 1332 connected with the first connecting plate 1331, wherein the first connecting plate 1331 is perpendicular to the first press-cutting plate 1332. The second rotary press-cutting portion 134 comprises a second connecting plate 1341 connected with the sixth driving member and a second press-cutting plate 1342 connected with the second connecting plate 1341, wherein the second connecting plate 1341 is perpendicular to the second press-cutting plate 1342. Thus, the structures of the first rotary press-cutting portion 133 and the second rotary press-cutting portion 134 are more suitable.

Preferably, each of the first rotary press-cutting portion 133 and the second rotary press-cutting portion 134 is in an L shape (as shown in FIG. 2) or T shape.

As shown in FIG. 2, the first rotary press-cutting portion 133 and the second rotary press-cutting portion 134 are arranged spaced apart in the first direction, the sixth driving member drives the first rotary press-cutting portion 133 to rotate in one of clockwise direction and counter-clockwise direction, and the sixth driving member drives the second rotary press-cutting portion 134 to rotate in the other of clockwise direction and counter-clockwise direction.

Specifically, as shown in FIG. 2, the press-cutting member 130 further comprises a transmission member (not shown) and a first rotating shaft 135 and a second rotating shaft 136, and the sixth driving member is connected to the first rotating shaft 135 and the second rotating shaft 136 via the transmission member so as to drive the first rotating shaft 135 to rotate in clockwise direction and drive the second rotating shaft 136 to rotate in counter-clockwise direction.

The first connecting plate 1331 is arranged horizontally, the left end of the first connecting plate 1331 is connected with the first rotating shaft 135, and the top end of the press-cutting plate 1332 is connected with the right end of the first connecting plate 1331. The second connecting plate 1341 is arranged horizontally, the right end of the second connecting plate 1341 is connected with the second rotating shaft 136, and the top end of the second press-cutting plate 1342 is connected with the left end of the second connecting plate 1341.

In some examples of the present invention, the device for press-cutting glass 10 further comprises a camera for capturing an image of scribing marks on the glass substrates, a conveying member for conveying the glass substrates, and a controller. The controller is connected with the camera and the conveying member so as to control the conveying member to carry out conveying by a preset distance according to the image captured by the camera. In other words, the controller is connected with the camera and the conveying member so as to control the conveying member to convey the glass substrate by a preset distance according to the image captured by the camera.

With the camera and the controller, the glass substrate can be conveyed automatically, and the level of automation of the device for press-cutting glass 10 is greatly improved.

Those skilled in the art may understand that the controller may be a well-known controller in the prior art. In addition, an appropriate model of controller may be selected according to the specific requirements. Since the controller may be a well-known controller in the prior art, the structure and model of the controller are not detailed here. Nevertheless, those skilled in the art still can implement a preferred technical solution for this aspect of the present application, and the disclosure here shall not be deemed as insufficient.

Specifically, the camera is spaced from the first supporting portion 121 by a first distance, and the camera is spaced from the second supporting portion 122 by a second distance. After the camera captured a scribing mark on a glass substrate, the controller controls the conveying member to convey said glass substrate by the second distance, i.e., the controller controls the conveying member to carry out a conveying by the second distance. After the camera captured a scribing mark on another glass substrate, the controller controls the conveying member to convey said another glass substrate by the first distance, i.e., the controller controls the conveying member to carry out a conveying by the first distance.

Preferably, after the camera captured a first scribing mark on a first glass substrate, the controller controls the conveying member to convey the first glass substrate by the first distance, and then the press-cutting member 130 press-cuts the edge of the first glass substrate at the first scribing mark.

After the camera captured a second scribing mark on the first glass substrate, the controller controls the conveying member to convey the first glass substrate by the second distance. After the camera captured a first scribing mark on the second glass substrate, the controller controls the conveying member to convey the second glass substrate by the first distance. Then, the press-cutting member 130 press-cuts the edge of the first glass substrate at the second scribing mark and the edge of the second glass substrate at the first scribing mark at the same time.

Then, after the camera captured a second scribing mark on the second glass substrate, the controller controls the conveying member to convey the second glass substrate by the second distance. After the camera captured a first scribing mark on a third glass substrate, the controller controls the conveying member to convey the third glass substrate by the first distance. Then, the press-cutting member 130 press-cuts the edge of the second glass substrate at the second scribing mark and the edge of the third glass substrate at the first scribing mark at the same time.

The process described above is repeated continuously, till the edges of all glass substrates perpendicular to the first direction are press-cut.

The present invention further provides a glass cutting system. The glass cutting system according to present invention comprises the device for press-cutting glass 10 described in the above embodiments. Furthermore, the glass cutting system according to present invention may further comprise a glass scribing device for scribing glass substrates to form a scribing mark. The glass scribing device may be a well-known one and independent from the inventive idea of the present application. Therefore, it is not further detailed here.

In the description of the present invention, it should be understood that the orientation or position relations indicated by terms "center", "longitudinal", "transverse", "length", "width", "thickness", "above", "below", "left", "right", "vertical", "horizontal", "top", "bottom", "inside", "outside", "clockwise", "counter-clockwise", "axial", "radial", or "circumferential", etc., are based on the orientation or position relations indicated in the accompanying drawings. They are used only to ease and simplify the description of the present invention, rather than indicate or imply that the involved device or component must have a specific orientation or must be constructed and operated in a specific orientation. Therefore, the use of these terms shall not be deemed as constituting any limitation to the present invention.

In addition, the terms "first" and "second" are used only for description purpose, and shall not be interpreted as indicating or implying relative importance or implicitly indicating the quantity of the indicated technical feature. Hence, a feature confined by "first" or "second" may explicitly or implicitly comprise at least one such feature. In the description of the present invention, "a plurality of" or "multiple" means at least two, such as two or more, etc., unless otherwise specified explicitly.

In the present invention, unless otherwise specified and defined explicitly, the terms "mount", "connect", "fix", etc. shall be interpreted in their general meaning. For example, the connection may be fixed connection, detachable connection, or integral connection; may be mechanical connection or electrical connection or in communication with each other; may be direct connection or indirect connection via an intermediate medium, or internal communication or interactive relation between two elements. Those having ordinary skills in the art may interpret the specific meanings of the terms in the present invention in their context.

In the present invention, unless otherwise specified and defined explicitly, a first feature "on" or "under" a second feature may represent that the first feature and the second feature directly contact with each other or the first feature and the second feature contact with each other indirectly via an intermediate medium. In addition, a first feature "above" or "over" a second feature may represent that the first feature is right above or diagonally above the second feature, or may only represent that the elevation of the first feature is higher than that of the second feature. A first feature being "below" or "beneath" a second feature may represent that the first feature is right below or diagonally below the second feature, or may only represent that the elevation of the first feature is lower than that of the second feature.

In the description of the present invention, the expressions of reference terms "an embodiment", "some embodiments", "an example", "specific example", or "some examples" mean that the specific features, structures, materials or characteristics described in those embodiments or examples are included in at least one embodiment or example of the present invention. In this document, the exemplary expression of the above terms may not necessarily refer to the same embodiment or example. Moreover, the specific features, structures, materials, or characteristics described can be combined appropriately in any one or more embodiments or example. Furthermore, those skilled in the art may combine or assemble different embodiments or examples and features in different embodiments or examples described herein, provided that there is no conflict among them.

While the present invention is illustrated and described above in embodiments, it should be understood that the embodiments are exemplary only and shall not be deemed as constituting any limitation to the present invention. Those skilled in the art can made variations, modifications, and replacements to the embodiments within the scope of the present invention.

The invention claimed is:

1. An assembly comprising a device for press-cutting glass, a first glass substrate, and a second glass substrate, the assembly comprising:
    a support having a first support and a second support, the first support and the second support arranged spaced apart in a first direction, wherein the first support supports the first glass substrate on a first surface of the first glass substrate, and the second support supports the second glass substrate on a first surface of the second glass substrate;
    a press-cutter positioned between the first support and the second support in the first direction and configured to contact a second surface of the first glass substrate and a second surface of the second glass substrate, the second surface of the first glass substrate opposite to the first surface of the first glass substrate and the second surface of the second glass substrate opposite to the first surface of the second glass substrate; and
    a stop comprising a first stop and a second stop, the first stop and the second stop arranged spaced apart in the first direction, wherein the first support and the second support are located between the first stop and the second stop in the first direction,
    the first stop comprising a first drive and a first pressing plate, the first drive connected with the first pressing plate so as to drive the first pressing plate to move up and down in a second direction perpendicular to the first direction; and the second stop comprising a second drive and a second pressing plate, the second drive connected with the second pressing plate so as to drive the second pressing plate to move up and down in the second direction, the first pressing plate and the second pressing plate configured to contact the respective second surfaces of the first glass substrate and the second glass substrate;
    the first support comprising a third drive and a first supporting pole, the third drive connected with the first supporting pole so as to drive the first supporting pole to move up and down in the second direction, the first supporting pole contacts the first surface of the first glass substrate;
    the second support comprising a fourth drive and a second supporting pole, the fourth drive connected with the second supporting pole so as to drive the second supporting pole to move up and down in the second direction, the second supporting pole contacts the first surface of the second glass substrate;
    wherein
    the press-cutter is configured to press-cut an edge of the first glass substrate and an edge of the second glass substrate respectively supported on the first support and the second support at the same time.

2. The assembly according to claim 1, wherein the first drive is an air cylinder, electric cylinder, electric motor or hydraulic cylinder, and the second drive is an air cylinder, electric cylinder, electric motor or hydraulic cylinder.

3. The assembly according to claim 1, wherein the third drive is an air cylinder, electric cylinder, electric motor or hydraulic cylinder, and the fourth drive is an air cylinder, electric cylinder, electric motor or hydraulic cylinder.

4. The assembly according to claim 1, wherein the press-cutting member comprises a pressing head and a fifth drive, and the fifth drive is connected with the pressing head so as to drive the pressing head to move up and down.

5. The assembly according to claim 4, wherein the fifth drive is an air cylinder, electric cylinder, electric motor or hydraulic cylinder.

6. A method for press-cutting glass, comprising the following steps:
    (a) positioning a first glass substrate having a first scribing mark at a first preset position in a first direction, the first scribing mark is perpendicular to the first direction, and press-cutting a first edge of the first glass substrate at the first scribing mark, the first glass substrate having a second scribing mark distal to the first edge and perpendicular to the first direction; and
    (b) positioning the first glass substrate having the second scribing mark at a second preset position adjacent to the first preset position in the first direction, positioning a second glass substrate having a third scribing mark at the first preset position in the first direction, the third scribing mark is perpendicular to the first direction, and press-cutting a second edge of the first glass substrate at the second scribing mark and press-cutting a first edge of the second glass substrate at the third scribing mark at the same time.

7. The method for press-cutting glass according to claim 6, wherein the method for press-cutting glass is implemented with a device for press-cutting glass, the device comprising a support having a first support and a second support, the first support and the second support arranged spaced apart in the first direction, wherein at step (b) and after positioning the second glass substrate, the first support and the second support are configured to be on a first surface of the first glass substrate and a first surface of the second glass substrate, respectively;

a press-cutter positioned between the first support and the second support in the first direction and on an opposite side of the first glass substrate or the first and second glass substrates relative to the support, wherein in step (a) the press-cutter is configured to affect the press-cutting at the first scribing mark, and in step (b) the press-cutter is configured affect the press-cutting at the second scribing mark and the third scribing mark; and a stop comprising a first stop and a second stop, the first stop and the second stop arranged spaced apart in the first direction, and the first support and the second support are located between the first stop and the second stop in the first direction, wherein the first stop comprises a first drive and a first pressing plate, the first drive connected with the first pressing plate so as to drive the first pressing plate to move up and down in a second direction perpendicular to the first direction; and the second stop comprising a second drive and a second pressing plate, the second drive connected with the second pressing plate so as to drive the second pressing plate to move up and down in the second direction, the first pressing plate configured to contact a second surface of the first glass substrate and the second pressing plate configured to contact a second surface of the second glass substrate, the second surface of the first glass substrate opposite to the first surface of the first glass substrate, and the second surface of the second glass substrate opposite to the first surface first surface of the second glass substrate;

the first support comprising a third drive and a first supporting pole, the third drive connected with the first supporting pole so as to drive the first supporting pole to move up and down in the second direction, the first supporting pole configured to contact the first surface of the first glass substrate in step (b);

the second support comprising a fourth drive and a second supporting pole, the fourth drive connected with the second supporting pole so as to drive the second supporting pole to move up and down in the second direction, the second supporting pole configured contact the first surface of the first glass substrate in step (a) and the first surface of the second glass substrate in step (b);

wherein the press-cutter is configured to affect the press-cutting at the second edge of the first glass substrate and the first edge of the second glass substrate respectively supported on the first support and the second support at the same time in step (b).

* * * * *